(12) United States Patent
Kadavan et al.

(10) Patent No.: US 12,461,974 B2
(45) Date of Patent: *Nov. 4, 2025

(54) POLICY-BASED TRUSTED PEER-TO-PEER CONNECTIONS

(71) Applicant: Omnissa, LLC, Mountain View, CA (US)

(72) Inventors: Seema Kadavan, Bangalore (IN); Manjunath Bhat, Bangalore (IN); Shanti Kamichetty, Bangalore (IN); Sachin Hallad, Bangalore (IN); Aparna Manu, Bangalore (IN); Manu Nazareth, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 880 days.

This patent is subject to a terminal disclaimer.

(21) Appl. No.: 17/188,451

(22) Filed: Mar. 1, 2021

(65) Prior Publication Data

US 2021/0182347 A1 Jun. 17, 2021

Related U.S. Application Data

(63) Continuation of application No. 14/886,120, filed on Oct. 19, 2015, now Pat. No. 10,936,674.

(30) Foreign Application Priority Data

Aug. 20, 2015 (IN) .......................... 4363/CHE/2015

(51) Int. Cl.
*H04L 29/08* (2006.01)
*G06F 16/951* (2019.01)
*H04L 9/40* (2022.01)
*H04L 29/06* (2006.01)
*H04L 29/12* (2006.01)
*H04L 61/2514* (2022.01)
*H04L 61/2589* (2022.01)
*H04L 67/1061* (2022.01)

(52) U.S. Cl.
CPC ........ *G06F 16/951* (2019.01); *H04L 61/2514* (2013.01); *H04L 61/2589* (2013.01); *H04L 63/20* (2013.01); *H04L 67/1063* (2013.01); *H04L 63/06* (2013.01); *H04L 63/10* (2013.01)

(58) Field of Classification Search
CPC ..... H04L 63/20; H04L 67/1063; H04L 63/06; H04L 63/10
USPC .......................................................... 726/1
See application file for complete search history.

(56) References Cited

U.S. PATENT DOCUMENTS

2015/0379286 A1* 12/2015 Nordback ............. H04L 9/0872
  713/165
2016/0050184 A1* 2/2016 Ockenfels ............... H04L 12/06
  713/171

* cited by examiner

*Primary Examiner* — Jahangir Kabir
(74) *Attorney, Agent, or Firm* — Kim & Stewart LLP

(57) ABSTRACT

Disclosed are various examples for implementations of policy-based trusted peer-to-peer connections. A computing device can receive a message from a first client device, the message specifying an identifier of a second client device. The computing device can then send a query to a computing device, wherein the query specifies the identifier of the second client device. The computing device can also determine that the first client device is authorized to communicate with the second client device based on a response to the query received from the second computing device. In some instances, the computing device can then send the public key of the second client device to the first client device.

20 Claims, 4 Drawing Sheets

POLICY-BASED TRUSTED PEER-TO-PEER CONNECTIONS

CROSS-REFERENCE TO RELATED APPLICATIONS

This application is a continuation of, and claims priority to, co-pending U.S. Patent Application entitled "POLICY-BASED TRUSTED PEER-TO-PEER CONNECTIONS," filed on Oct. 19, 2015 and assigned application Ser. No. 14/886,120, which is incorporated by reference as if set forth herein in its entirety.

BACKGROUND

Client devices often need to communicate with each other directly. For example, data can be transferred directly from one client device to another (e.g. a file or contact information). As another example, clients can send messages directly between each other, such as chat messages.

Some data sent between clients can be of a sensitive nature. For example, corporate documents can be protected from corporate espionage. Similarly, sensitive messages, such as those between high-ranking executives, can require protection. If one or both of the client devices directly communicating with each other have been compromised, sensitive data can be stolen or otherwise exfiltrated from the enterprise through a compromised device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various examples for providing a policy-based trusted peer-to-peer connection between two or more client devices. Two or more client devices can attempt to directly connect with each other in order to exchange data. However, each device is unaware whether the other device has been compromised or is otherwise safe to communicate with. Accordingly, each device can provide information to a relay service. The relay service can query a mobile device management service to determine the status of each client device and whether each client device is permitted to communicate with the other client device. Whether a client device is permitted to communicate with another client device can be determined by one or more applicable policies that are accessible to the mobile device management service. In the event that the client devices are managed by different mobile device management services, the corresponding mobile device management services can communicate with each other to determine if the respective client devices are authorized to communicate with each other.

Figure 1:
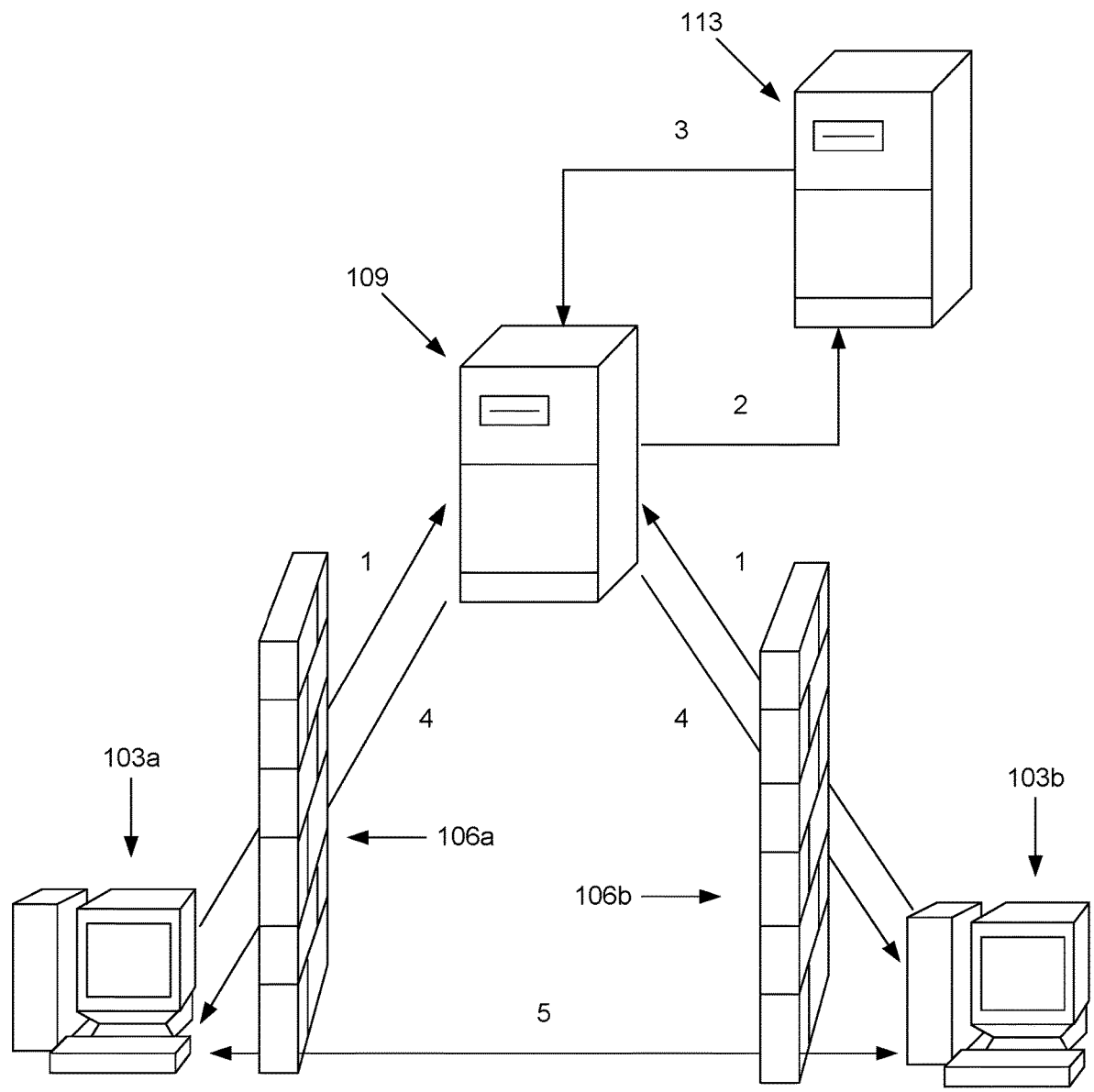
FIG. 1 is a depiction of operation of one example of the present disclosure.

With reference to FIG. 1, shown is one example according to the present disclosure. Two client devices 103a and 103b, located behind firewalls 106a and 106b, attempt to establish a direct connection with each other. In some instances, the firewalls 106a and 106b can provide network address translation (NAT) functionality, hiding the private internet protocol (IP) address of each client device 103a and 103b behind of the public IP address of the corresponding firewall 106a and firewall 106b.

To establish the connection, each client device 103a and 103b can send a message at step 1 to a relay server 109 providing a relay service. For example, the first client device 103a can send a message to the relay server 109. The message can include the public address of the first client device 103a, the device identifier of the first client device 103a, and a device identifier for the second client device 103b. In some examples, the message can also include a public key of the first client device 103a. The public address of the first client device 103a can correspond to the fully qualified domain name (FQDN) or IP address of the external network interface of the firewall 106a for the first client device 103a. The public address of the first client device 103a can also include a port number for a port on the external interface of the firewall 106a on which the first client device 103a can listen for connections from the second client device 103b.

The relay server 109 can then send a query to a management server 113 that provides a management service to determine whether the two client devices 103a and 103b are authorized to communicate with each other. The query can specify the device identifier of each of the client devices 103a and 103b. In response, the management server 113 can identify one or more policies that are applicable to the client devices 103a and 103b. If the applicable policies permit the two client devices 103a and 103b to communicate with each other, then the management server 113 can send a reply at step 3 to the relay server 109 indicating that the client devices 103a and 103b are authorized to communicate with each other. If the applicable policies do not permit the two client devices 103a and 103b to communicate with each other, then the management server 113 can send a reply at step 3 to the relay server 109 indicating the same.

Assuming that the management server 113 has authorized the client devices 103a and 103b to communicate with each other, the relay server 109 can send a response at step 4 to each client device 103a and 103b. For example, the relay server 109 can respond to the request from the first client device 103a with a message specifying the public address of the second client device 103b. In some instances, the relay server 109 can also include a public key associated with the second client device 103b.

At step 5, the two client devices 103a and 103b directly connect to each other using the public address of each client device 103a and 103b. If the two client devices 103a and 103b have not already received corresponding public keys from the relay server 109, then the two client devices 103a and 103b can exchange public keys. Each client device 103a and 103b can then encrypt data sent to the other client device using the appropriate public key.

In some instances, the client devices 103a and 103b can instead use their public keys to negotiate a shared secret key. For example, the client devices 103a and 103b can use the Diffie-Hellman key exchange protocol, or a similar protocol, to generate a shared secret key for use with a symmetric encryption algorithm, such as the advanced encryption standard (AES), Twofish, Blowfish, Serpent, or similar algorithms. The use of the symmetric encryption algorithm would allow for more efficient encryption of data transferred between the two client devices 103*a* and 103*b*.

Figure 2:
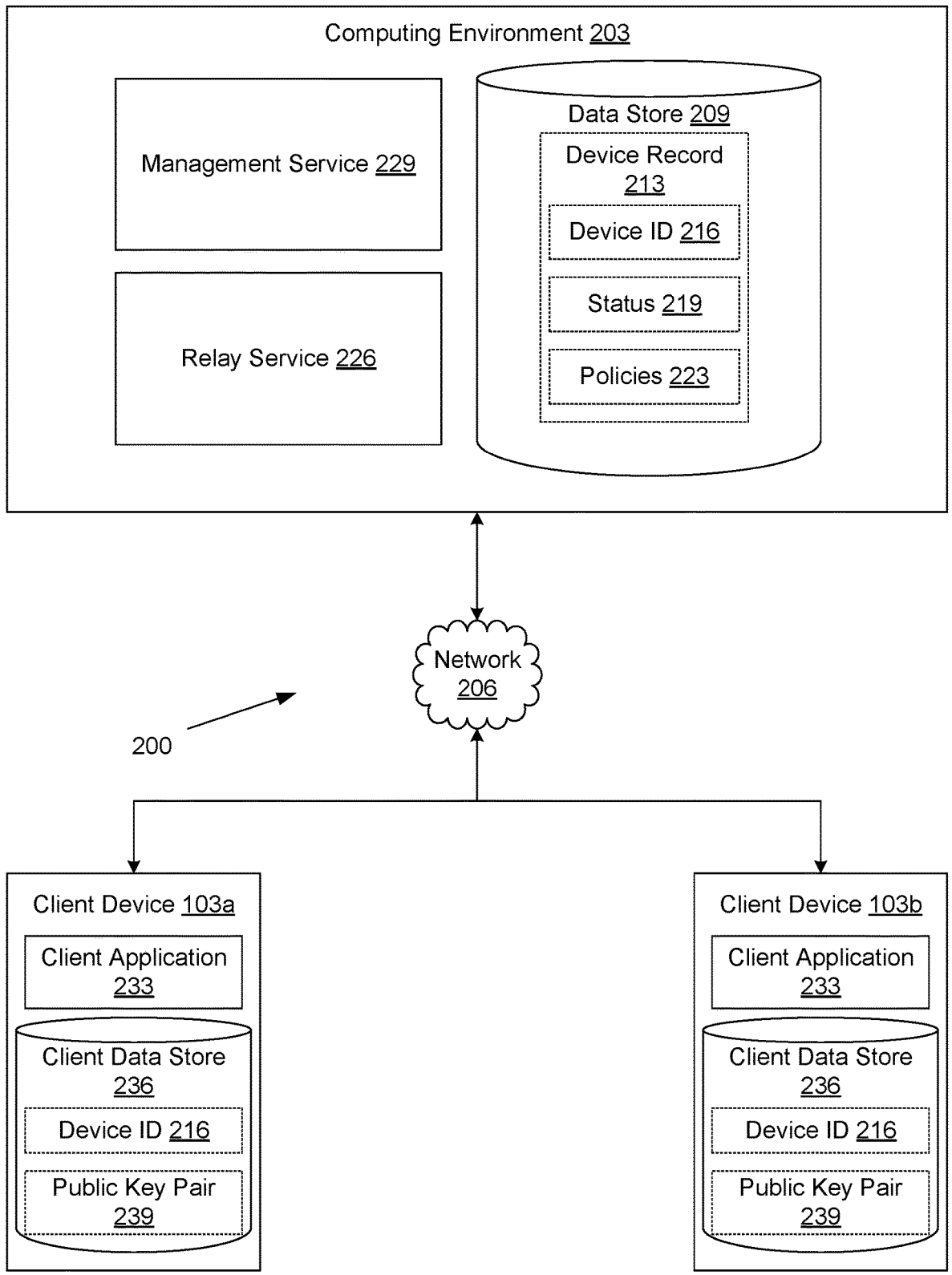
FIG. 2 is a schematic block diagram of a networking environment.

With reference to FIG. 2, shown is a schematic block diagram of a networked environment 200 according to various examples of the present disclosure. The networked environment 200 includes a computing environment 203, and two or more client devices 103*a* and 103*b*, which are in data communication with each other via a network 206. The network 206 includes the Internet, intranets, extranets, wide area networks (WANs), local area networks (LANs), wired networks, wireless networks, or other suitable networks, etc., or any combination of two or more networks. For example, the networks can include satellite networks, cable networks, Ethernet networks, and other types of networks.

The computing environment 203 can include a server computer or any other system providing computing capability. Alternatively, the computing environment 203 can employ a plurality of computing devices that can be arranged in one or more server banks or computer banks or other arrangements. The computing devices can be located in a single installation or can be distributed among many different geographical locations. For example, the computing environment 203 can include a plurality of computing devices that together can include a hosted computing resource, a grid computing resource, or any other distributed computing arrangement. In some cases, the computing environment 203 can correspond to an elastic computing resource where the allotted capacity of processing, network, storage, or other computing-related resources can vary over time. Various applications or other functionality can be executed in the computing environment 203 according to various embodiments.

Also, various data is stored in a data store 209 that is accessible to the computing environment 203. The data store 209 can be representative of a plurality of data stores 209 as can be appreciated. The data stored in the data store 209 can include one or more device records 213, and potentially other data.

Each device record 213 can correspond to at least one client device 103, such as client device 103*a* or client device 103*b*. Each device record 213 can include a device identifier 216 that can link the device record 213 to a particular client device 103. Each device record 213 can also include a status 219 to indicate the status of the corresponding client device 103. Each device record 213 can also include one or more policies 223 applicable to the corresponding client device 1-3.

A device identifier 216 can represent an identifier that uniquely identifies a client device 103. For example, a device identifier 216 can represent a media access control (MAC) address of a network interface for a client device 103. In another example, a device identifier 216 can represent a serial number of a client device 103. As another example, the device identifier 216 can correspond to international mobile equipment identity (IMEI) number of a cellular modem, radio, or similar interface of the client device 103.

A status 216 can represent a current status of the client device 103. As an example, a status 216 can represent whether a client device 103 has been marked as compromised. As another example, a status 216 can represent the type of client device 103 (e.g. personal device vs. company owned device) or the identity of the owner of the client device 103. A status 216 can also represent the location of the client device 103. In some instances, the status 216 can represent whether the client device 103 is connected to a particular network (e.g. internal network, external network, Wi-Fi, cellular network, or other network). Other types of status indications can also be recorded for the status 219 of the client device 103 associated with the device record 213.

Policies 223 can represent one or more policies to be applied to a client device 103 represented by the device record 213. A policy 223 can specify whether a client device 103 is authorized to communicate with another client device 103. For example, a policy 223 can specify that a first client device 103*a* is authorized to communicate with a second client device 103*b* if the status 219 of the second client device 103*b* indicates that the second client device 103*b* has not been compromised. Similarly, a policy 223 can specify that a first client device 103*a* is authorized to communicate with a second client device 103*b* based on other statuses 219 of the second client device 103*b*. In other instances, the policy 223 can instead authorize the first client device 103*a* to communicate with the second client device 103*b* based on the status 219 of the first client device 103*a*.

As another example, a policy 223 can specify that a first client device 103*a* is authorized to communicate with a second client device 103*b* if the second client device 103*b* is registered to a particular owner. In some instances, a policy 223 can specify that a first client device 103*a* can communicate with a second client device 103*b* if a particular user is currently logged into the second client device 103*b*. As another example, a policy 223 can specify that a first client device 103*a* can communicate with a second client device 103*b* so long as the operating system of the second client device 103*b* is the current version of the operating system (e.g. the current version of Android® or iOS® instead of an older version).

In some examples, a policy 223 can specify that a first client device 103*a* is authorized to communicate with a second client device 103*b* so long as the second client device 103*b* is in a particular location. For example, the first client device 103*a* could be authorized to communicate with the second client device 103*b* when the second client device 103*b* is connected to or within range of a particular WiFi network or cellular phone tower. As another example, the first client device 103*a* could be authorized to communicate with the second client device 103*b* when the second client device 103*b* is at or near a particular set of coordinates (e.g. coordinates reported by a global positioning system (GPS) receiver in the second client device 103*b*). The time that the second client device 103*b* has remained at the location can also be taken into account. For example, the first client device 103*a* can be authorized to communicate with the second client device 103*b* if the second client device 103*b* has remained at a location for longer than a specified period of time.

In various instances, a policy 223 can also authorize the first client device 103*a* to communicate with the second client device 103*b* based on the registered owner of the first client device 103*a*, the current user of the first client device 103*a*, the current version of the operating system of the first client device 103*a*, the current location of the first client device 103*a*, or the current status of the first client device 103*a*. For example, the first client device 103*a* can be authorized to communicate with the second client device 103*b* based on whether the status of the second client device 103*b* indicates that the second client device 103*b* has been rooted or jailbroken. As another example, the first client device 103*a* can be authorized to communicate with the second client device 103*b* based on whether the status of the second client device 103*b* indicates that the second client device 103b has a VPN tunnel configured or enabled. In another example, the first client device 103a can be authorized to communicate with the second client device 103b based on whether the status of the second client device 103b indicates that the second client device 103b is managed by another entity or is owned by another entity. As another example, the first client device 103a can be authorized to communicate with the second client device 103b based on whether the status of the second client device 103b indicates that the second client device 103b is using an authorized application to communicate with the first client device 103a.

The components executed on the computing environment 203 can include a relay service 226, a management service 229, and other applications, services, processes, systems, engines, or functionality not discussed in detail herein. The relay service 226 can relay network information between client devices 103a and 103b in order for the client device 103a and client device 103b to initiate a direct communication link between each other. The management service 229 can determine whether the client devices 103a and 103b are authorized to communicate with each other according to one or more applicable policies 223.

The client device 103 is representative of a plurality of client devices 103 that can be coupled to the network 206. The client device 103 can include a processor-based system, such as a computer system. The computer system can include a desktop computer, a laptop computer, a personal digital assistant, a cellular telephone, a smartphone, a set-top box, a music player, a web pad, a tablet computer system, a game console, an electronic book reader, or another device with like capability.

The client device 103 can execute various applications such as a client application 233 or other applications. The client application 233 can be executed by a client device 103 to access network content. In some instances, the client application 233 can initiate a direct connection with another instance of the client application 233 executing on another client device 103 in order to share or exchange data with the other client device 103. The client device 103 can also execute applications beyond the client application 233 such as email applications, social networking applications, word processors, spreadsheets, or other applications.

The client device 103 can also include a client data store 236 that stores various types of data locally on the client device 103. The client data store 236 can include a local database, data stored locally in a memory of the client device 103, as well as various other types of data stores. Various types of data can be stored in the client data store 236. This can include a device identifier 216 for the client device 103, as previously described above, and a public key pair 239 associated with the client device 103.

The public key pair 239 represents an asymmetric cryptographic key pair that can include a public encryption key and a corresponding private encryption key. For example, the public key pair 239 can correspond to a key pair for the Rivest, Shamir and Adleman (RSA) algorithm, the Elgamal encryption algorithm, or various elliptic curve cryptographic (ECC) algorithms. The public key pair 239 of a client device 103 can be used to secure communications with other client devices 103.

The public key pair 239 can be either a static public key pair 239 or a dynamically generated public key pair 239. For example, a static public key pair 239 can be generated once and used to secure all communications with the client device 103 until the public key pair 239 is revoked or otherwise disabled. In contrast, a dynamically generated public key pair 239 can be generated on an as needed basis for temporary use. For example, a client device 103 can generate a new public key pair 239 every time a connection is established with another client device 103. This approach ensures that if a public key pair 239 is stolen or otherwise compromised, only the communications for the particular connection secured by that public key pair 239 can be decrypted. All other communications would still be secure.

Next, a general description of the operation of the various components of the networked environment 100 is provided. To begin, two client devices 103a and 103b, attempt to establish a direct connection with each other. For example, the first client device 103a can send a message to the second client device 103b requesting to establish a connection. In some instances, the second client device 103b can be configured to deny requests send directly from the first client device 103a. Thus, the second client device 103b can be configured to send, in instances where the client devices 103a and 103b are communicating with the HTTP protocol, an HTTP 401 unauthorized response to the first client device 103a. In some examples, in response to receiving a denial from the second client device 103b, the first client device 103a can be configured to establish a connection with the second client device 103b through the relay service 226.

In any case, to establish the connection, each client device 103a and 103b can send a message to the relay service 226. For example, the first client device 103a can send a message to the relay service 226. The message can include the public address of the first client device 103a, the device identifier 216 of the first client device 103a, and a device identifier 216 for the second client device 103b. In some examples, the message can also include a public key of the public key pair 239 of the first client device 103a. The public address of the first client device 103a can correspond to the fully qualified domain name (FQDN) or IP address of the network interface for the first client device 103a or a publicly accessible FQDN or IP address of firewall in front of the first client device 103a. The public address of the first client device 103a can also include a port number for a port on which the first client device 103a can listen for connections from the second client device 103b.

The relay service 226 can then send a query to the management service 229 to determine whether the two client devices 103a and 103b are authorized to communicate with each other. The query can specify the device identifier 216 of each of the client devices 103a and 103b. In response, the management service 229 can identify one or more policies 223 that are applicable to the client devices 103a and 103b. If the applicable policies 223 permit the two client devices 103a and 103b to communicate with each other, then the management service 229 can send a reply the relay service 226 indicating that the client devices 103a and 103b are authorized to communicate with each other. If the applicable policies 223 do not permit the two client devices 103a and 103b to communicate with each other, then the management service 229 can send a reply to the relay service 226 indicating the same.

Assuming that the management service 229 has authorized the client devices 103a and 103b to communicate with each other, the relay service 226 can send a response to each client device 103a and 103b. For example, the relay service 226 can respond to the request from the first client device 103a with a message specifying the public address of the second client device 103b. In some instances, the relay service 226 can also include a public key from the public key pair 239 associated with the second client device 103b.

The two client devices 103a and 103b can then directly connect to each other using the public address of each client device 103a and 103b. If the two client devices 103a and 103b have not already received corresponding public keys from the relay service 226, then the two client devices 103a and 103b can exchange public keys. Each client device 103a and 103b can then encrypt data sent to the other client device using the appropriate public key.

In some instances, the client devices 103a and 103b can instead use their public keys to negotiate a shared secret key. For example, the client devices 103a and 103b can use the Diffie-Hellman key exchange protocol, or a similar protocol, to generate a shared secret key for use with a symmetric encryption algorithm, such as the advanced encryption standard (AES), Twofish, Blowfish, Serpent, or similar algorithms. The use of the symmetric encryption algorithm would allow for more efficient encryption of data transferred between the two client devices 103a and 103b.

Figure 3:
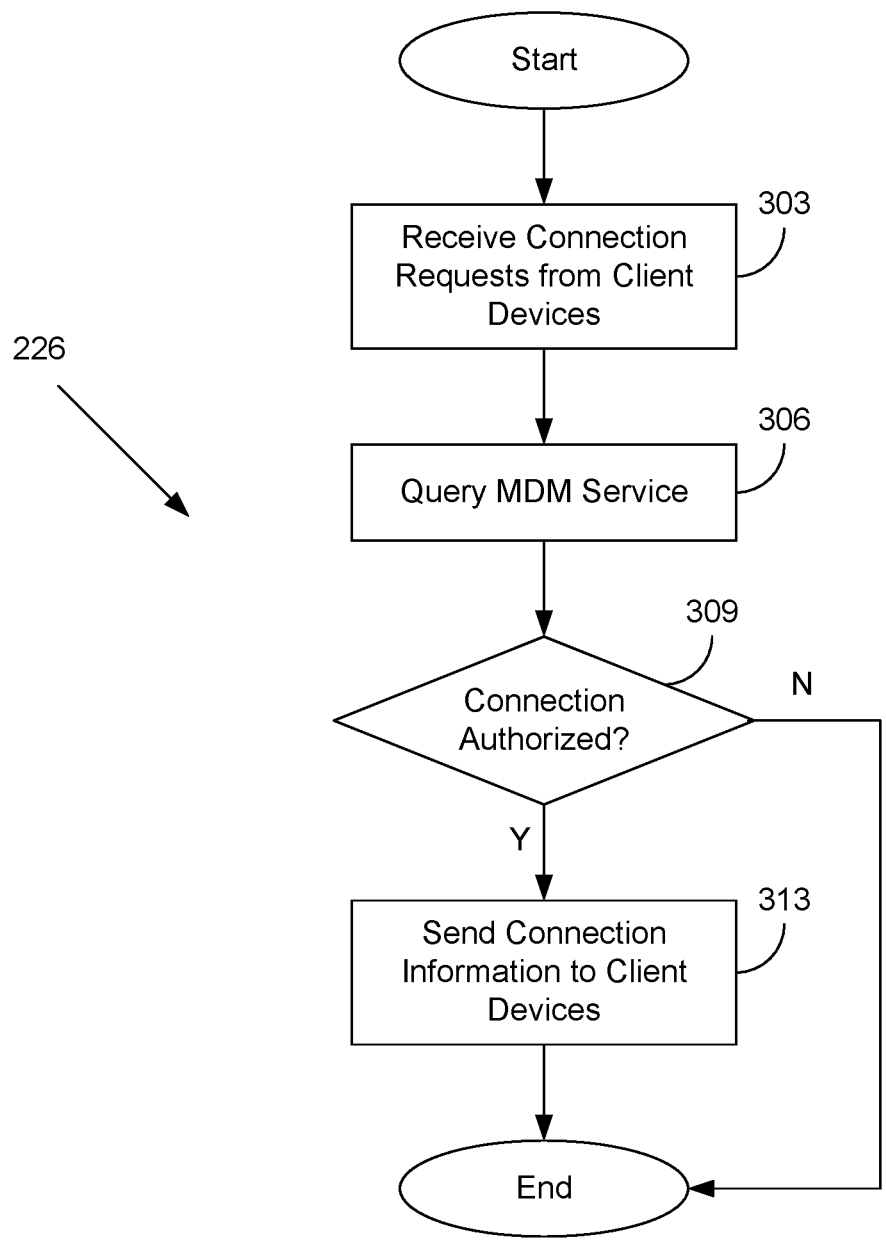
FIG. 3 is a flowchart depicting the operation of one or more components of the networking environment of FIG. 2.

Referring next to FIG. 3, shown is a flowchart that provides one example of the operation of a portion of the relay service 226. As an alternative, the flowchart of FIG. 3 can be viewed as depicting an example of elements of a method implemented in the client device 100.

Beginning with step 303, the relay service 226 receives a connection request from a first client device 103a and a second client device 103b. The connection request from the first client device 103a can include a device identifier 216 of the second client device 103b, a port number and an IP address complying with a version of the internet protocol (e.g. IPv4 or IPv6) or fully qualified domain name. The connection request from the second client device 103b can include a device identifier 216 of the first client device 103a, a port number and an IP address complying with a version of the internet protocol (e.g. IPv4 or IPv6) or a fully qualified domain name.

Moving on to step 306, the relay service 226 can send a query to the management service 229. The query can specify the device identifier 216 of the first client device 103a and the device identifier 216 of the second client device 103b. The relay service 226 may, in some instances, send the query to multiple management services 229. For instance, the first client device 103a and the second client device 103b can be managed by different management services 229. For example, the first client device 103a can be associated with one department or division within a company while the second client device 103b can be associated another department or division of the same company. As another example, the first client device 103a and the second client device 103b can be owned or associated with different companies. Accordingly, the relay service 226 can need to send the query to two separate management services 229 in this instance.

Proceeding next to step 309, the relay service 226 analyzes a response to the query received from the management service 229 to determine whether a connection between the first client device 103a and the second client device 103b is authorized. The response from the management service 229 can indicate whether or not the first client device 103a and the second client device 103b are allowed or otherwise authorized to communicate with each other through a direct connection. If the direct connection between the first client device 103a and the second client device 103b is authorized, then the process proceeds to step 313. Otherwise, the process ends.

Referring next to step 313, the relay service 226 can send the necessary connection information to each client device 103. For example, the relay service 226 can send the public address of the first client device 103a to the second client device 103b and vice versa. If public keys were provided to the relay service 226 at step 303, then the relay service 226 can also provide the public key of the first client device 103a to the second client device 103b and vice versa. Execution of the process then ends.

Figure 4:
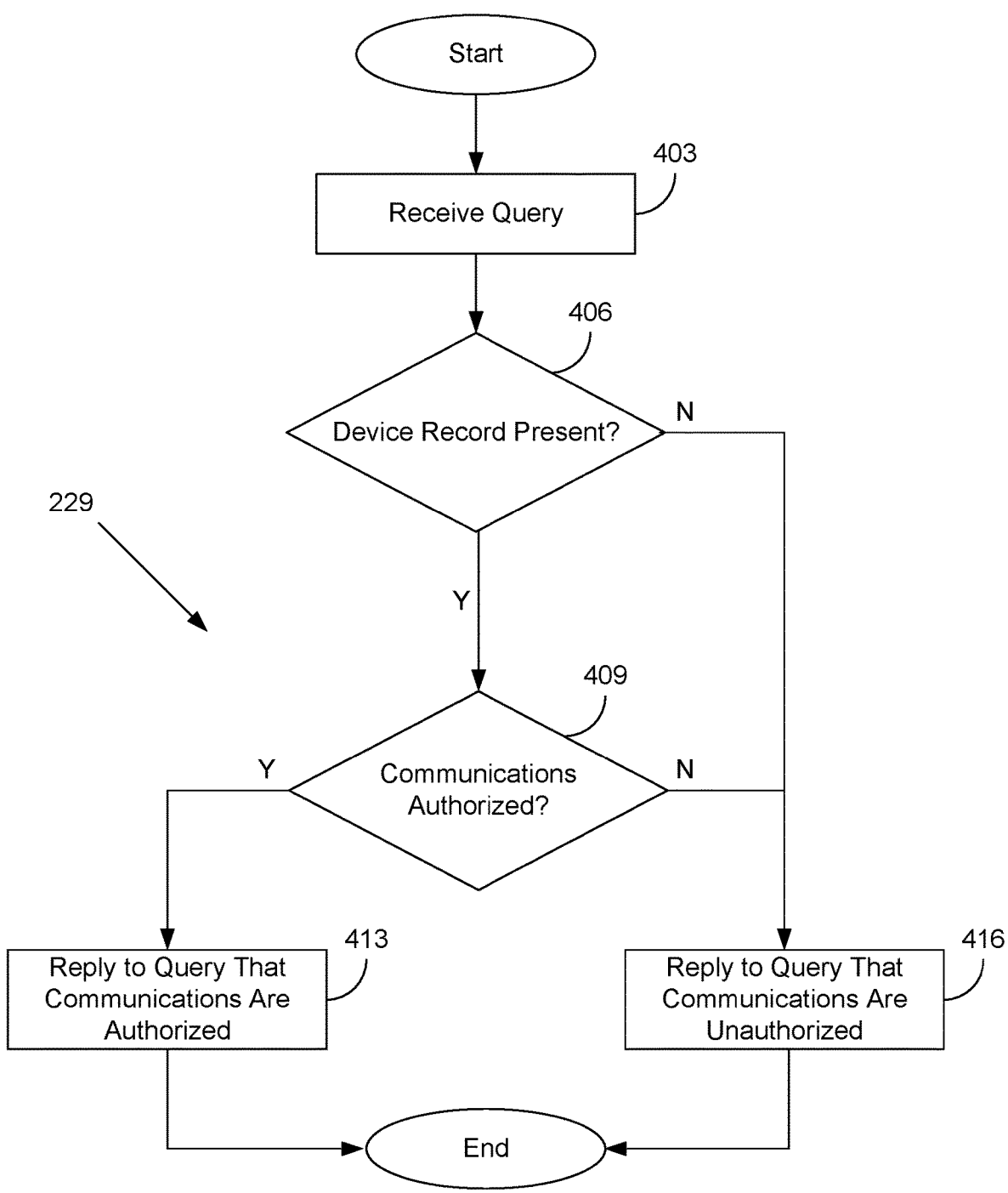
FIG. 4 is a flowchart depicting the operation of one or more components of the networking environment of FIG. 2.

Referring next to FIG. 4, shown is a flowchart that provides one example of the operation of a portion of the management service 229. As an alternative, the flowchart of FIG. 4 can be viewed as depicting an example of elements of a method implemented in the client device 103

Beginning with step 403, the management service 229 receives a query from the relay service 226. The query can specify the device identifier 216 of a first client device 103a and the device identifier of a second client device 103b.

Moving on to step 406, the management service 229 determines whether a device record 213 specifying one or more policies 223 for the first client device 103a or the second client device 103b is accessible to the management service 229. For example, the management service 229 can determine whether a device record 213 exists with a device identifier 216 that matches the device identifier 216 provided by the first client device 103a. If a matching device record 213 for the first client device 103a is found, then the process proceeds to step 409. If no device record 213 is found for the first client device 103a, then the process skips to step 416. Similar determinations can be made with respect to the second client device 103b.

Proceeding next to step 409, the management service 229 determines whether the client devices 103 are authorized to communicate directly with each other. For example, the management service 229 can identify one or more policies 233 listed in the device record 213 for the first client device 103a that would prohibit communication between the first client device 103a and the second client device 103b based on the current status of the first client device 103a or the second client device 103b. Similarly, the management service 229 can identify one or more policies 233 listed in the device record 213 for the second client device 103b that would prohibit communication between the first client device 103a and the second client device 103b. If no applicable policy 233 is found that indicates that communication between the first client device 103a and the second client device 103b is prohibited, then the process proceeds to step 413. Otherwise, the process proceeds to step 416.

However, some instances can allow for an alternative implementation of step 409. In these instances, communication between the first client device 103a and the second client device 103b is presumed to be prohibited. The management service 229 can then identify one or more policies 233 listed in the device record 213 for the first client device 103a that would allow for communication between the first client device 103a and the second client device 103b. Similarly, the management service 229 can identify one or more policies 233 listed in the device record 213 for the second client device 103b that would allow for communication between the first client device 103a and the second client device 103b. If a policy 233 is identified, then the process proceeds to step 413. Otherwise, the process proceeds to step 416.

Although the first client device 103a and the second client device 103b may be configured to continuously or periodically send updates to the management service 229 or the relay service 226 regarding their current status, the relay service 226 can be configured to request, retrieve, or otherwise poll the first client device 103a and the second client device 103b for their current status at step 409. For example, the relay service 226 may send a request to the second client device 103b to determine the current status of the second client device 103b. The relay service 226 may then compare the current status of the second client device 103b with the identified policies 233 to determine if the first client device 103a is authorized to communicate with the second client device 103b. A similar request for the status of the first client device 103a can also be made and the results compared to the identified policies 233.

Referring next to step 413, the management service 229 can send a response to the relay service 226 that communication between the first client device 103a and the second client device 103b is authorized or allowed. The process then ends.

Moving on to step 416, the management service 229 can send a response to the relay service 226 that communication between the first client device 103s and the second client device 103b is unauthorized or otherwise not permitted. The process then ends.

The flowcharts of FIG. 3 and FIG. 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIG. 3 and FIG. 4, show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The client device 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The relay service 226, the management service 229, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, or programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A system, comprising:
   a computing device comprising a processor and a memory; and
   machine-readable instructions stored in the memory and executable by the processor, wherein the machine-readable instructions, when executed, cause the computing device to at least:
   receive a message from a first client device, the message comprising an identifier of a second client device;
   send a query to a management server, wherein the query specifies the identifier of the second client device in order to identify a device status of the second client device;
   determine that the first client device is authorized to communicate with the second client device based at least in part on a response to the query received from the management server, the response indicating that communication between the first client device and the second client device is authorized based on the device status of the second client device; and
   send a public key associated with the second client device to the first client device in response to the determination that the first client device is authorized to communicate with the second client device, wherein the public key is associated with a dynamically generated public key pair and is configured for encrypted communication with the second client device.

2. The system of claim 1, wherein the public key is a first second public key associated with the second client device, and the machine-readable instructions, when executed, further cause the computing device to:
   send a first public key associated with the first client device to the second client device in response to the determination that the first client device is authorized to communicate with the second client device.

3. The system of claim 1, wherein the public key is a second public key, and the machine-readable instructions, when executed, cause the computing device to at least:
determine that the first client device is authorized to communicate with a third client device based at least in part on a second response received from the management server; and
send a third public key associated with the third client device to the first client device in response to the determination that the first client device is authorized to communicate with the third client device.

4. The system of claim 1, wherein the public key is restricted for encrypting communication between the first client device and the second client device.

5. The system of claim 1, wherein the machine-readable instructions, when executed, cause the computing device to at least:
send a public address associated with the second client device to the first client device.

6. The system of claim 5, wherein the public address of the second client device comprises at least one of a port number, an Internet Protocol address, or a fully qualified domain name.

7. The system of claim 1, wherein the device status of the second client device comprises at least one of:
a current user of the second client device;
a current version of an operating system of the second client device;
an identity of a current network connection of the second client device; or
a current location of the second client device.

8. A method, comprising:
receiving, using a computing device, a message from a first client device, the message comprising an identifier of a second client device;
sending, using the computing device, a query to a management server, wherein the query specifies the identifier of the second client device in order to identify a device status of the second client device;
determining, using the computing device, that the first client device is authorized to communicate with the second client device based at least in part on a response to the query received from the management server, the response indicating that communication between the first client device and the second client device is authorized based on the device status of the second client device; and
sending, using the computing device, a public key associated with the second client device to the first client device in response to the determination that the first client device is authorized to communicate with the second client device, wherein the public key is associated with a dynamically generated public key pair and is configured for encrypted communication with the second client device.

9. The method of claim 8, further comprising:
sending, using the computing device, a first public key associated with the first client device to the second client device in response to the determination that the first client device is authorized to communicate with the second client device.

10. The method of claim 8, wherein the public key is a first second public key, and further comprising:
determining, using the computing device, that the first client device is authorized to communicate with a third client device based at least in part on a second response received from the management server; and
sending, using the computing device, a third public key associated with the third client device to the first client device in response to the determination that the first client device is authorized to communicate with the third client device.

11. The method of claim 8, wherein the public key is restricted for encrypting communication between the first client device and the second client device.

12. The method of claim 8, further comprising:
sending, using the computing device, a public address associated with the second client device to the first client device.

13. The method of claim 12, wherein the public address of the second client device comprises at least one of a port number, an Internet Protocol address, or a fully qualified domain name.

14. The method of claim 8, wherein the device status of the second client device comprises at least one of:
a current user of the second client device;
a current version of an operating system of the second client device;
an identity of a current network connection of the second client device; or
a current location of the second client device.

15. A non-transitory computer-readable medium comprising a set of instructions that, when executed by a processor of a computing device, cause the computing device to at least:
receive a message from a first client device, the message comprising an identifier of a second client device;
send a query to a management server, wherein the query specifies the identifier of the second client device in order to identify a device status of the second client device;
determine that the first client device is authorized to communicate with the second client device based at least in part on a response to the query received from the management server, the response indicating that communication between the first client device and the second client device is authorized based on the device status of the second client device; and
send a public key associated with the second client device to the first client device in response to the determination that the first client device is authorized to communicate with the second client device, wherein the public key is associated with a dynamically generated public key pair and is configured for encrypted communication with the second client device.

16. The non-transitory computer-readable medium of claim 15, wherein the public key is a second public key associated with the second client device, and the set of instructions, when executed, further cause the computing device to:
send a first public key associated with the first client device to the second client device in response to the determination that the first client device is authorized to communicate with the second client device.

17. The non-transitory computer-readable medium of claim 15, wherein the public key is a second public key, and the set of instructions, when executed, cause the computing device to at least:
determine that the first client device is authorized to communicate with a third client device based at least in part on a second response received from the management server; and send a third public key associated with the third client device to the first client device in response to the determination that the first client device is authorized to communicate with the third client device.

18. The non-transitory computer-readable medium of claim 15,
wherein the computing device is a relay server.

19. The non-transitory computer-readable medium of claim 15, wherein the set of instructions, when executed, cause the computing device to at least:
send a public address associated with the second client device to the first client device.

20. The non-transitory computer-readable medium of claim 19, wherein the public address of the second client device comprises at least one of a port number, an Internet Protocol address, or a fully qualified domain name.

\* \* \* \* \*